United States Patent

[11] 3,576,446

[72] Inventors Norman Green;
William E. Krause, Baltimore, Md.
[21] Appl. No. 740,388
[22] Filed June 26, 1968
[45] Patented Apr. 27, 1971
[73] Assignee The Bendix Corporation

[54] PULSE GATE
15 Claims, 2 Drawing Figs.

Figure 1:
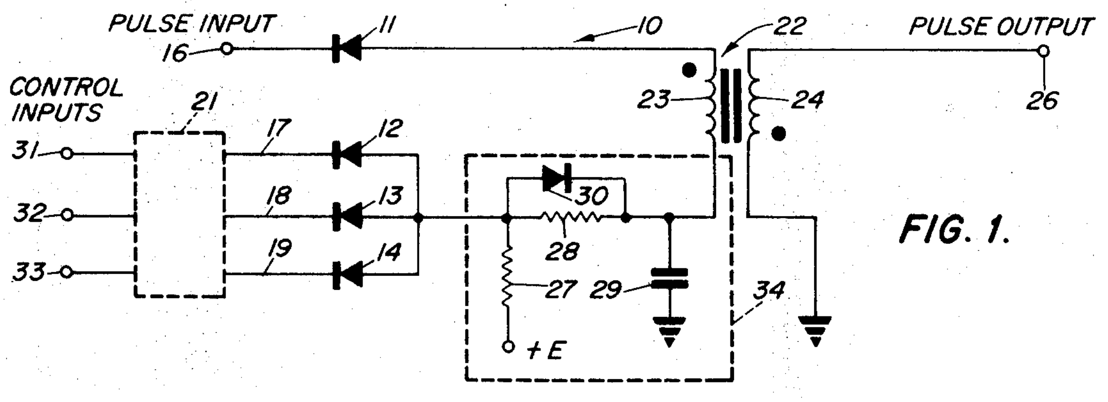

[52] U.S. Cl. .......... 307/217, 307/218, 328/94
[51] Int. Cl. .......... H03k 19/20
[50] Field of Search .......... 328/94, 99, 65; 307/217

[56] References Cited

UNITED STATES PATENTS

| | | | |
|---|---|---|---|
| 2,688,695 | 9/1954 | O'Dell .......... | 328/94 |
| 3,099,720 | 7/1963 | Gotthardt .......... | 307/217 |
| 3,151,314 | 9/1964 | Root et al. .......... | 307/217 |
| 3,165,639 | 1/1965 | Robinson .......... | 328/99 |

FOREIGN PATENTS

| | | | |
|---|---|---|---|
| 741,452 | 12/1955 | Great Britain .......... | 328/99 |

OTHER REFERENCES

" Inhibited Logic Circuit," IBM Technical Disclosure, Vol. 7, No. 9, February 1965, p. 848 (Copy in 307/217).

*Primary Examiner*—Donald D. Forrer
*Assistant Examiner*—Harold A. Dixon
*Attorneys*—Plante, Arens, Hartz and O'Brien and Lester L. Hallacher ABSTRACT: This invention describes a pulse gate which is useful with information present in a digital format the system is composed of an input circuit and a control circuit. The control circuit is capable of generating signals which inhibit the system and thereby prevent an output therefrom during the presence of input signals on the input terminal. The system utilizes a pulse transformer, the secondary of which is used to generate the output pulse. A logic AND gate is used to control the inhibit function. A logic OR gate can be used to receive the input signal. These two logic circuits are connected to opposite sides of the transformer primary. The inhibit circuit is designed such that the control times for the enable and inhibit functions can be discretely chosen. The use of a pulse transformer in the system has several distinct advantages. Firstly, the transformer affords an excellent opportunity to match the impedance between the input and output terminals of the system. Excellent isolation between the input and output terminals is also realized by the use of the transformer. By selecting the inductive coupling of the transformer the polarity of the output can be chosen irrespective of the polarity of the input signal. A multiprimary transformer can be used and thereby increase the versatility of the system. By using such a transformer the system acts as a logic OR gate, each input of which can likewise be a logic OR gate.

NORMAN GREEN
WILLIAM E. KRAUSE
INVENTORS

BY *[signature]*
ATTORNEY

PULSE GATE

The use of digital format as a means of relaying information is becoming more widely used as the techniques for utilizing and handling the digital information improve. Examples of systems using digital format are automatic control systems for aircraft, communication systems, navigation systems and obviously any system used in conjunction with an electronic computer. Many such systems, particularly aircraft control and navigation systems, utilize redundant equipment. Such equipment frequently includes identical systems so that an operable system is available for immediate use upon the failure of the system in operation. These systems operate in either of two manners. In the first mode of operation one system operates continuously, while the other is on stand-by in the event of a failure in the operating system. In the second mode of operation both systems alternately operate on a time sharing basis. An advantage of this mode of operation is the ability to compare the outputs from the two systems and thereby obtain an average reading over a prolonged preselected time period. Operation in this manner minimizes the possibility of error of the reading and thereby minimizes the effects of a system which is functioning improperly. In either mode of operation the generation of an enable and/or an inhibit signal is necessary to the intended operation. The system described herein is particularly useful in any of these types of systems.

Systems using information which is in the digital format require the use of logic circuits which respond to particular combinations of inputs to yield an output. These logic circuits are well defined in the art and their functions and nomenclatures are well established. Several examples of such circuits are AND gates, OR gates, NAND and NOR gates. These circuits usually have a plurality of input terminals and a single output terminal. The generation of an output signal is dependent upon the presence of the proper combination of input signals on the input terminals. By properly selecting and combining logic circuits digital information can be utilized to perform many desired operations, one of which is the control of the redundant systems briefly described herein above. The systems composed primarily of logic circuitry must possess several basic qualities before acceptable operation can be achieved. Among these qualities is the ability of the circuit to respond to pulse inputs and generate an output in pulse form. Such systems must frequently be responsive to only one polarity of input pulse and must generate an output pulse of the preselected polarity. The versatility of the system requires that it be capable of responding to many different combinations of input information and to generate a particular output in response thereto as the operational characteristics of the system demand. Another important requirement of such systems is the ability to respond rapidly to input signals. Such systems must also possess isolation between the input and output terminals of the system.

Many digital systems presently exist in which a series of control or command voltage levels are used to control a series of input pulses. In such systems the voltage level preceding the trailing edge of the control pulse is used to control the state of the input pulse. Such systems are disadvantageous because the timing of the control pulses and the input pulses may be skewed and therefore the desired change of state fails to take place. This skewing is partially caused by wiring delays inherent in the circuitry. This difficulty is sometimes overcome by delaying the control pulse for a period sufficient to offset the wiring delays. The usual delay schemes require the use of active elements and/or resistors and capacitors and are therefore decreased in efficiency. Another disadvantage of some of these systems is the need for a two phase clock, with a separate delay for all the control pulse inputs. Another disadvantage of prior art systems is the inability to inhibit a particular polarity pulse with an inhibit pulse of the same polarity. Because of this deficiency the systems require either separate clock inputs or else pulse inverters to invert either the input or control pulses. The inventive system described herein possesses all of the above stated advantages in addition to several not found in the prior art and also overcomes the disadvantages present in existing systems discussed above.

The inventive system includes an AND gate and an OR gate which are used to receive input and control pulses respectively. An input on the OR gate results in an output of the system only when the AND gate is receiving the proper combination of inputs. In this manner the AND gate acts as a control for inhibit and enable conditions of the system. Pulse integrity of the input signals and, therefore, of the output signals is maintained by the use of a pulse transformer. The transformer also provides excellent isolation between the input and output terminals. The system is highly versatile because a number of transformer primaries can be used. The variety of the logic inputs to which the system will respond is therefore very broad and is limited only by the practical design considerations of the transformer. The control signals are applied to one side of the transformer primary and the input signals to the other side. The control signals can therefore be delayed independently of the input signals. This connection in conjunction with a diode in the input circuit results in the ability to inhibit input pulses of a particular polarity with inhibit pulses of the same polarity. That is, negative input pulses can be inhibited with negative control pulses; this is also true for positive input and control pulses.

It is therefore an object of this invention to provide a pulse gate which responds to many combinations of input pulses, depending only upon the desired response of the circuit determined at the time it is designed.

It is another object of this invention to provide such a system which responds only to a selected polarity of inputs and is inhibited for any other polarity.

It is another object to provide such a system which has a built-in delay time.

It is another object to provide such a system which contains a memory function for maintaining a knowledge of the previous condition of the system until the next succeeding condition is achieved.

It is another object to provide such a system in which the input terminals and output terminals are isolated from one another.

It is another object to provide such a system in which the output pulse is generated as a result of the input pulse and, therefore, it is a more nearly ideally shaped pulse than it would be if it were merely the input pulse which simply passed through the circuit.

It is another object of this invention to provide a system which can be designed to respond to any polarity of input signal, but will respond to only the design polarity.

It is another object to provide a system in which input signals of a particular polarity can be inhibited by control signals of the same polarity.

It is another object to provide such a system which is useful in redundant electronic systems having a stand-by type of operation.

It is another object to provide such a system which is useful in time sharing type of redundant systems.

Figure 2:
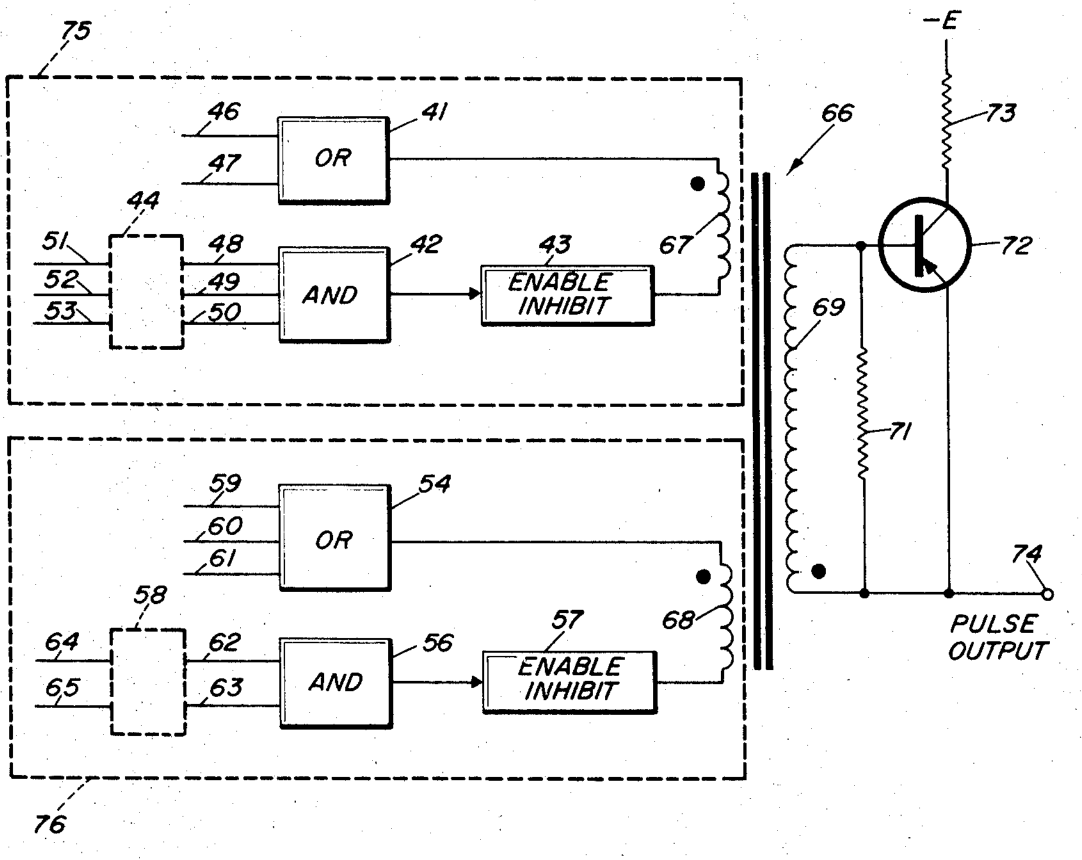

Further objects, features and advantages of the invention will become apparent from the following description and claims when read in view of the accompanying drawings, wherein like numbers indicate like parts and in which:

FIG. 1 shows a simplified schematic diagram of the basic circuit comprising the instant invention; and FIG. 2 demonstrates the versatility of the basic circuit of FIG. 1 and shows how it can readily be incorporated into a redundant electronic system.

In FIG. 1 the reference numeral 10 generally indicates the basic circuit of the invention. An input Diode 11 is connected to one side of the Primary 23 of a Transformer 22. A plurality of Diodes 12, 13 and 14 are connected to the other side of Primary 23 through a Resistor 28. Input Diode 11 receives an input pulse from input Terminal 16. Diodes 12 to 14 receive control signals on Input Leads 31 to 33 respectively, through a Switching Mechanism 21. A Capacitor 29 is connected to the junction of the Resistor 28 and Primary 23. A biasing voltage is applied to Resistor 28 through a Resistor 27. A Diode 30 is shunted around Resistor 28. Elements 27 through 30 form an Enable-Inhibit Circuit 34 generally indicated by reference number 34 enclosed in broken lines, the operation of which will be described hereinafter. Pulses present on Primary 23 result in the generation of an output pulse on terminal 26 by Secondary 24 of Transformer 22 unless Enable-Inhibit Circuit 34 inhibits the system, as described hereinafter.

The operation of the circuit is such that the presence of a negative input on any one of Leads 17, 18 and 19, respectively connected to diodes 12, 13 and 14, results in the generation of an inhibit signal. During the presence of an inhibit signal an input pulse on Terminal 16 will fail to result in the generation of an output pulse on Terminal 26.

The Switching Mechanism 21 is designed such that, in the absence of control inputs on Input Terminals 31, 32 and 33, Leads 17, 18 and 19 are at ground potential. The exact type of switching mechanism forms no part of the invention and any one of many available can be used; for example, mechanical switches or preferably solid state switching mechanisms can be used. For simplicity of understanding, assume that conducting diodes present negligible voltage drops and back-biased diodes are open circuits. These assumptions are reasonably accurate and are frequently made when analyzing diode circuitry. With the positive biasing potential applied at Resistor 27 current flows through Diodes 12, 13 and 14 to the grounds applied by Switch 21. The potential at the junction of Primary 23 and Resistor 28 is therefore zero volts. In this condition the pulse gate is enabled and a negative input pulse on Terminal 16 will pass through Diode 11 to Primary 23. The opposed polarity of the Primary 23 and Secondary 24 will therefore result in the generation of a positive output pulse on Terminal 26. It should be noted that a negative output pulse can be generated simply by reversing the winding of either Primary 23 or Secondary 24. When a negative control pulse is applied to either of Input Terminals 31, 32 or 33, one of Diodes 12, 13 or 14 will be switched from ground potential to negative potential by Switching Mechanism 21. This negative potential will pass through one of the diodes resulting in a negative potential present at the junction of Resistors 27 and 28. Capacitor 29 will be charged to this negative potential through Resistor 28. The charging time constant will be dependent upon the values of Resistor 28 and Capacitor 29. The pulse gate is now inhibited because Diode 11 is back-biased by the negative potential at the junction of Secondary 23 and Capacitor 29 and therefore the application of a negative impulse to Terminal 16 will have no effect on the output. This is so because Diode 11 is back-biased and consequently cannot pass the input signal. Upon removal of the negative potential from the Control Input 31, 32 or 33, Capacitor 29 will discharge through Diode 30 and Resistor 27. At the completion of the discharge the potential at the junction of Primary 23 and Capacitor 29 is again zero volts and the pulse gate is again enabled. Diode 30, which shunts Resistor 28, permits the selection of discrete time functions for the inhibit and enable functions. The negative signal coming from the Diodes 12, 13 and 14 charges Capacitor 29 at a time constant dependent upon the values of Resistor 28 and Capacitor 29, while the discharge of Capacitor 29 is dependent upon the value of Resistor 27 because Diode 30 bypasses Resistor 28 during the discharge. Consequently the two time constants can be individually chosen simply by properly selecting the values of Resistors 27 and 28. The use of Diode 30 is therefore optional depending upon the need for different charge and discharge time constants. The delays of the enable and inhibit functions provide a temporary storage of the logic condition existing. The Delay Circuit 34 can be modified in any of several manners, depending upon the delay time desired. For example, a much shorter delay time can be realized by using an inductor between the junction of Diodes 12, 13 and 14 and Primary 23. Obviously, the delay time can be completely eliminated if the desired operational characteristics of the Pulse Gate require or permit.

The connection of Diodes 12, 13 and 14 is such that they operate in the manner of a logic AND gate having a logic 1 for zero potential on the inputs and a logic 0 for a negative potential on the inputs. It should be noted that the pulse gate as described is intended for use with negative input and control signals. This is a matter of design choice because the circuit will operate with positive input and control signals simply by reversing the polarity of Diodes 11, 12, 13, 14 and 30 and also the polarity of the biasing source on Resistor 27. It should also be noted that the input pulses are shown applied to a single Terminal 16 and a single Diode 11. This is a design choice in that any number of input terminals and diodes can be used. By using more than one diode the input side of Primary 23 takes the form of a logic OR gate.

The circuit shown in FIG. 2 shows the use of several of the basic circuits of FIG. 1 used in a redundant type of system. The system is such that an input pulse to either of the Circuits generally indicated as 75 and 76 will result in an output pulse on Terminal 74 if the circuit receiving the input pulse is in the enabled condition. The system therefore operates as a logic OR system. The half of the OR system generally indicated by reference numeral 75 is shown to contain an OR gate 41, an AND gate 42, and an Enable-Inhibit Circuit 43. AND gate 42 and Enable-Inhibit Circuit 43 operate in a manner identical to that described with respect to FIG. 1. Consequently, an input signal on any of Input Leads 51, 52 and 53 results in the application of a negative potential on one of Leads 48, 49 and 50 by Switch 44. The circuit is then inhibited. In the absence of such a control signal the circuit is enabled and an input on either of Input Terminals 46 or 47 is passed by OR gate 41 to the Primary 67 of Transformer 66. The same operation occurs with respect to the circuit indicated by reference numeral 76. In this circuit OR gate 54 is shown having three Inputs 59, 60 and 61. AND gate 56 is shown having only two Inputs 62 and 63. The different number of inputs for the two OR gates 41 and 54 and the two AND gates 42 and 56 illustrates that the number of inputs used is a design option dependent entirely upon the intended use of the system. Transformer 66 is wound with two Primaries 67 and 68. Consequently, the overall circuit acts as an OR gate and therefore an input pulse present on either of Primaries 67 or 68 results in an output pulse on Secondary 69. The standard dot designation is used to indicate that the polarity of the pulse present on Secondary 69 will be the opposite of that of the pulse present on the Primary 67 or 68. This is also a design feature in that the output and input pulses can have identical polarities if desired. The use of opposite polarities for the primary and secondary results in a built-in delay. The magnetic field of the transformer stores energy during the existence of a pulse on the primary and an output pulse is produced when the magnetic field collapses upon the termination of the input pulse. This results in a built-in delay in the circuit which is advantageous in some instances. With the reverse polarity for Transformer 66 a negative pulse on Primary 67 or 68 results in a positive pulse on Secondary 69. The leading edge of the pulse present at transformer secondary therefore is going positive and renders Transistor 72 nonconductive. This condition remains until the pulse starts going negative, at which time Transistor 72 is turned on and begins to generate the system output pulse. The delay of the system is therefore dependent upon the time duration of the input pulses applied to Terminal 16 (or 46, 47, 59 to 61). The output from Secondary 69 is applied to the base of a Transistor 72. This causes the generation of an output pulse on Terminal 74. Transistor 72 is included merely as an illustration of one means of utilizing the output pulse generated by the secondary of the transformer. Obviously any of the many available uses can be employed.

It is now quite obvious that the embodiment shown in FIG. 2 readily lends itself to use in redundant control systems. As a matter of illustration, assume that the redundant system is connected such that Circuit 75 is enabled and therefore is used to generate the system output pulse. In this mode of operation the operating system will apply input signals to OR gate 41 and control signals to AND gate 56 which inhibits Circuit 76 of the system. Upon failure of the operating system the input signal to OR gate 41 will no longer exist; this is also true of the control signal to AND gate 56. Circuit 76 will then be enabled and the redundant system which goes into operation upon the failure of the first system will then apply a control signal to AND gate 42 and an input signal to OR gate 54. Circuit 76 is then used to actuate Transformer 66 and consequently cause development of the output pulse. Obviously the system could easily be incorporated into a time sharing system simply by the alternate application of control and input signals to the two Circuits 75 and 76. It should also be noted that the FIG. 2 embodiment is itself a redundant system in that an output pulse can be realized if either of the Circuits 75 or 76 suffer a failure of any of the elements contained therein.

Although this invention has been described with respect to particular embodiments thereof, it is not to be so limited, as changes and modifications may be made therein which are within the spirit and scope of the invention as defined by the appended claims.

We claim:

1. A pulse gate for receiving input pulses and generating an output signal comprising:
- circuit input means, including at least one polarity sensitive electron control means, for receiving input signals;
- circuit control means, including at least one polarity sensitive electron control means, for receiving control signals;
- means for enabling and inhibiting said pulse gate connected to said circuit control means; and
- a transformer having a primary and a secondary, said primary of said transformer being connected between said circuit input means and said means for enabling and inhibiting, said secondary of said transformer generating the output of said pulse gate.

2. The pulse gate of claim 1 wherein said electron control means are diodes, said circuit input means including at least two diodes to form a logic OR gate, said circuit control means including at least two diodes to form a logic AND gate.

3. The pulse gate of claim 2 wherein said means for enabling and inhibiting includes a capacitor connected between the primary of said transformer and ground, a resistor connected between said AND gate and the junction of said capacitor and said primary, and means for applying a biasing voltage to said resistor.

4. The pulse gate of claim 3 including a diode shunting said resistor.

5. The pulse gate of claim 1 wherein said transformer is a pulse transformer, and wherein said circuit input means and said circuit control means respond to the same polarity.

6. The pulse gate of claim 1 wherein said electron control means are diodes, the diodes of said circuit control means being connected to form a logic AND gate.

7. The pulse gate of claim 6 wherein said circuit input means includes at least two diodes connected to form an OR gate.

8. The pulse gate of claim 7 fur further including a utilization device receiving the output of said transformer secondary.

9. The pulse gate of claim 8 wherein said utilization device is a transistor having its base connected to said secondary so that said transformer generates an output pulse in response to an input pulse on said circuit input means when said pulse gate is actuated.

10. The pulse gate of claim 1 wherein said transformer has at least two substantially identical primaries, said pulse gate further including; additional circuit input means, additional circuit control means, and additional means for actuating and inhibiting, said additional elements being substantially identical to the first of said elements and being connected to the additional primaries of said transformers in the same manner as said first elements are connected to the first primary so that said pulse gate has at least two circuit input means and at least two circuit control means which can individually actuate said pulse gate which thereby has a logic OR operation.

11. The pulse gate of claim 10 wherein said electron control means are diodes, said circuit input means each include at least two diodes to form logic AND gates.

12. The pulse gate of claim 10 wherein said electron control means are diodes, said circuit input means each include a different number of said diodes, and said circuit control means each include a different number of said diodes any of the circuit input means having more than one diode functioning as an OR gate, and any of the circuit control means having more than one diode functioning as an AND gate.

13. The pulse gate of claim 11 wherein said means for actuating and inhibiting each include a capacitor connected between one of said primaries and ground, a resistor connected between one of said AND gates and the junction of said capacitor and said primary, and means for biasing said resistor.

14. A pulse gate providing independently preselectable delay time for the enable and the inhibit functions, comprising:
- diode signal input means,
- diode control input means,
- a transformer primary connected to said signal input means,
- a transformer secondary providing an output signal whenever a signal is present in said transformer primary,
- means for enabling and inhibiting connected between said control input means and said transformer primary whereby said diode signal input means is reverse biased to prevent the transmission of signal to said transformer primary when an inhibit control level is present at said control input means, said means for enabling and inhibiting including;
- an energy storage means,
- a first resistor connected between said energy storage means and said control input means whereby a gate inhibit delay is determined by the time constant of said first resistor and said energy storage means,
- a diode shunting said first resistor, and
- a second resistor connected to the junction of said first resistor and said diode at said connection to said control input means whereby a gate enable delay is determined by the time constant of said second resistor and said energy storage means.

15. A compound, OR connected pulse gate providing independently preselectable delay times for each of the enable and each of the inhibit functions, comprising:
- a plurality of diode signal input means,
- a plurality of diode control input means,
- a plurality of transformer primaries, one said primary being connected to each said signal input means,
- a transformer secondary providing an output signal whenever a signal is present in any of said transformer primaries,
- a plurality of means for enabling and inhibiting, one said means for enabling and inhibiting connected between each said control input means and each said transformer primary whereby each said diode signal input means is reverse biased to prevent the transmission of signal to its associated transformer primary when an inhibit control level is present at its associated control input means, each of said means for enabling and inhibiting including;
- an energy storage means,
- a first resistor connected between said energy storage means and said control input means whereby a gate inhibit delay is determined by the time constant of said first resistor and said energy storage means,
- a diode shunting said first resistor, and
- a second resistor connected to the function of said first resistor and said diode at said connection to said control input means whereby a gate enable delay is determined by the time constant of said second resistor and said energy storage means.